Jan. 10, 1961
R. L. HILL
2,967,386
MACHINE FOR LOADING INTO CONTAINERS SUBSTANTIALLY
UNIFORM PIECES OF A SOLID SUBSTANCE HAVING
A TENDENCY TO ADHERE TO THE MACHINE
Filed Sept. 3, 1958
2 Sheets-Sheet 1
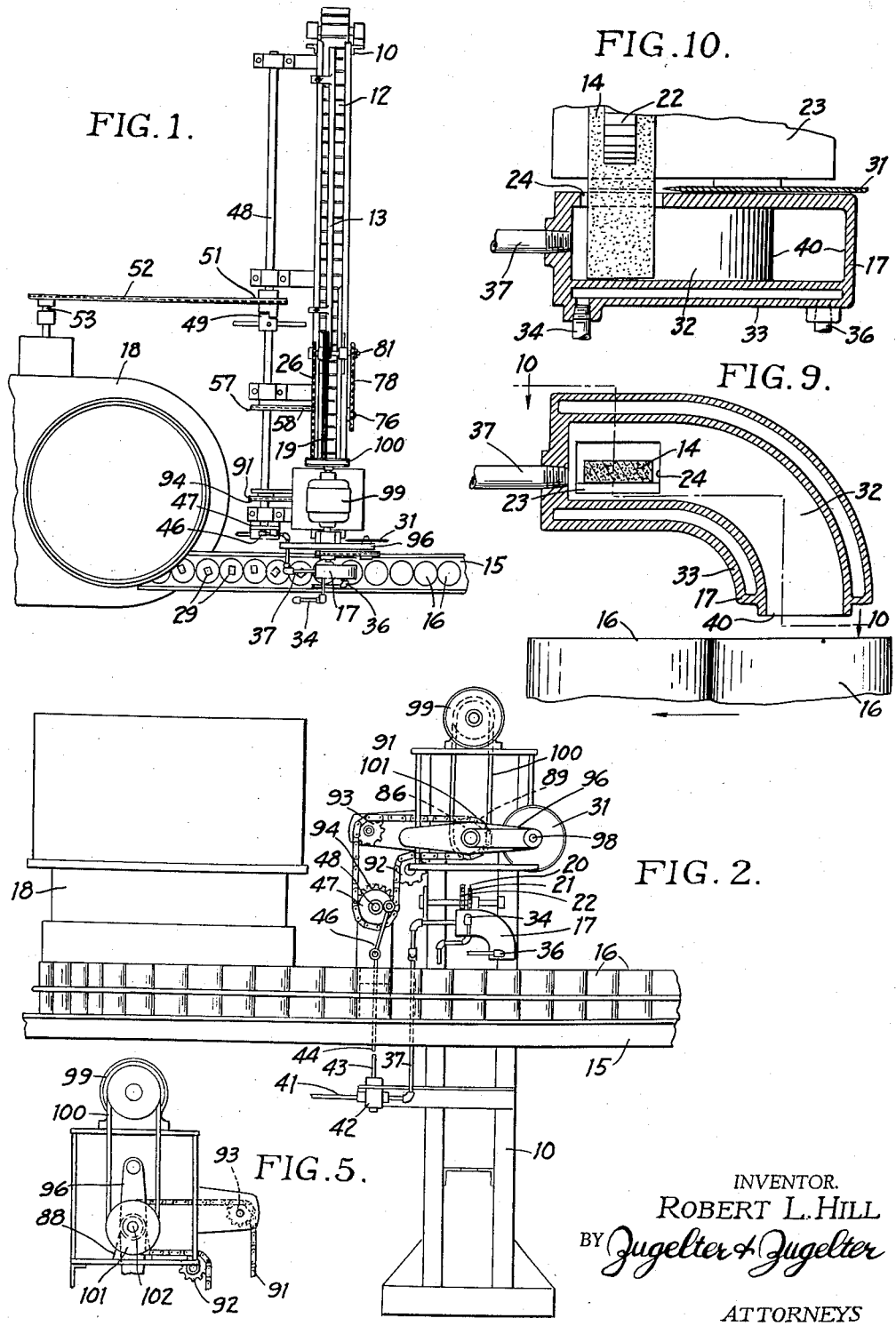
INVENTOR.
ROBERT L. HILL
BY Jugelter & Jugelter
ATTORNEYS Jan. 10, 1961
R. L. HILL
2,967,386
MACHINE FOR LOADING INTO CONTAINERS SUBSTANTIALLY
UNIFORM PIECES OF A SOLID SUBSTANCE HAVING
A TENDENCY TO ADHERE TO THE MACHINE
Filed Sept. 3, 1958
2 Sheets-Sheet 2
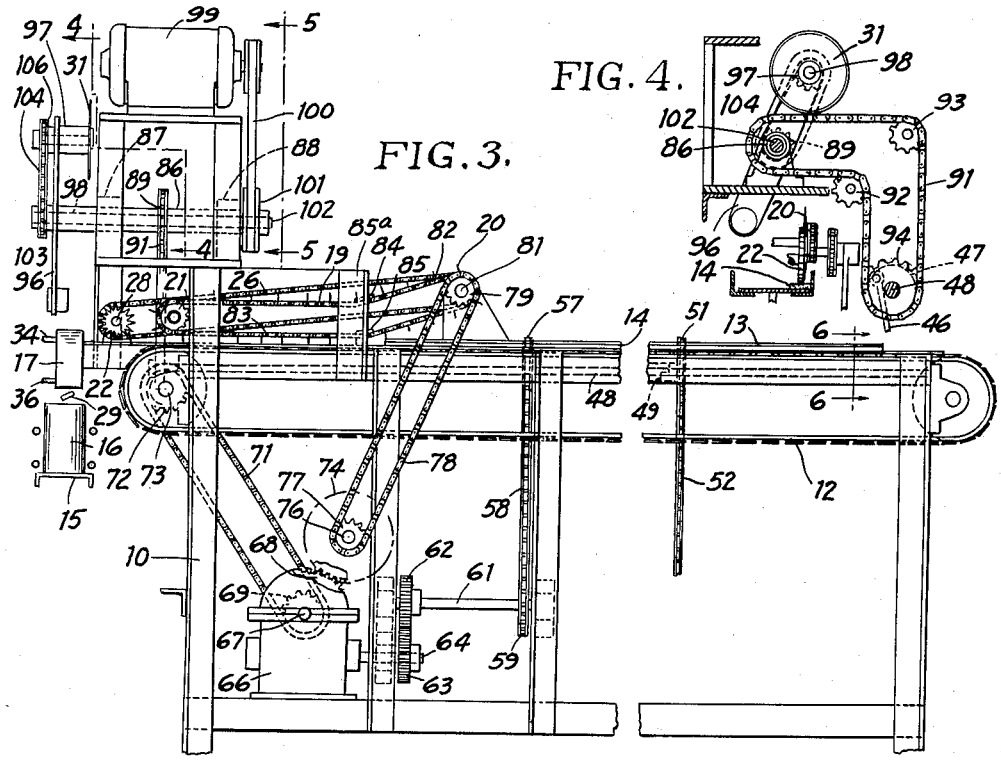
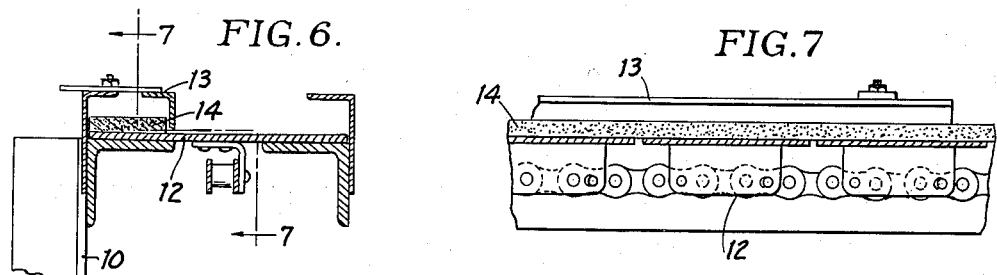
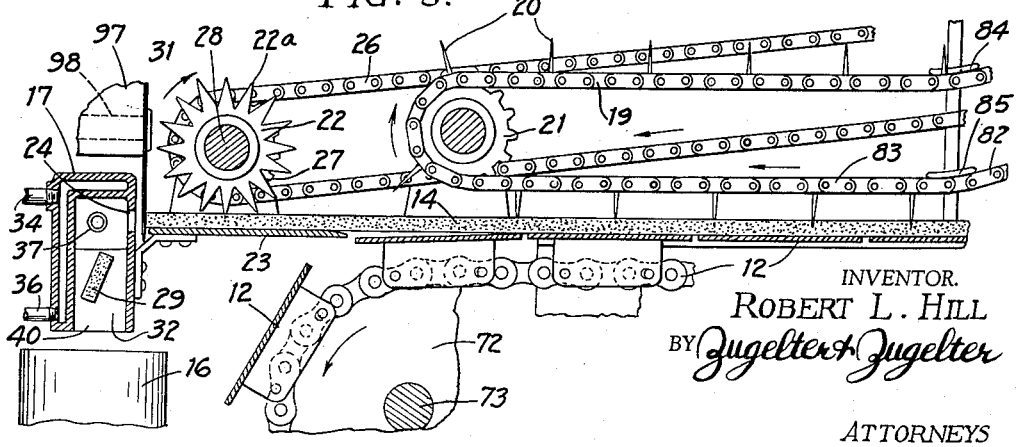
INVENTOR.
ROBERT L. HILL
BY Jugelter & Jugelter
ATTORNEYS United States Patent Office 2,967,386
Patented Jan. 10, 1961

2,967,386

MACHINE FOR LOADING INTO CONTAINERS SUBSTANTIALLY UNIFORM PIECES OF A SOLID SUBSTANCE HAVING A TENDENCY TO ADHERE TO THE MACHINE

Robert L. Hill, Austin, Ind., assignor to Morgan Packing Company, Inc., Austin, Ind., a corporation of Indiana Filed Sept. 3, 1958, Ser. No. 758,856

4 Claims. (Cl. 53—123)

This invention relates to the loading of containers. More particularly, this invention relates to a device for loading into containers substantially uniform pieces of a solid substance such as fat meat which tends to adhere to portions of the loading machine.

In the past, the practice has been in the loading of cans of pork and beans to drop pieces of pork fat or bacon or other fat meat into each can of pork and beans by hand. An object of this invention is to provide a machine which automatically cuts and drops one piece of pork fat meat or the like into each can passing the machine.

Past attempts to feed pieces of pork fat meat and the like into cans have been unsatisfactory because of the tendency of the fat meat to stick to feeding devices and to leave deposits of fat therein. A further object of this invention is to provide a feeding device having a head through which pieces of fat meat or the like are dropped or blown into the cans which head is heated to prevent adherence of the fat or fatty material to the walls of the head.

A further object of this invention is to provide a machine of this type in which fat meat or the like is fed to the head in the form of an elongated strip from which pieces are cut as the strip enters the head.

The above and other objects and features of this invention will be apparent to those skilled in the art to which this invention pertains, from the following detailed description, and the drawings, in which:

Figure 1 is a somewhat schematic plan view of a machine constructed in accordance with an embodiment of this invention, some frame members being omitted for clarity;

Fig. 2 is a view in front elevation of the machine illustrated in Fig. 1 on a larger scale;

Fig. 3 is a view in side elevation of the machine illustrated in Figs. 1 and 2;

Fig. 4 is a somewhat schematic view in section taken on the line 4—4 in Fig. 3, partly broken away for clarity, some frame elements being omitted for clarity;

Fig. 5 is a view looking in the direction of arrows 5—5 in Fig. 3;

Fig. 6 is an enlarged fragmentary view in transverse section of a portion of the machine showing a conveyor and guides for guiding a strip of fat meat;

Fig. 7 is a view in section taken on the line 7—7 in Fig. 6;

Fig. 8 is an enlarged, fragmentary view in lengthwise section of a portion of the machine, frame elements thereof being omitted for clarity;

Fig. 9 is an enlarged view in lengthwise section of a head which forms a part of the machine; and Fig. 10 is a view in section taken on the line 10—10 in Fig. 9;

In the following detailed description, and the drawings, like reference characters indicate like parts.

As shown in Figs. 2 and 3, the machine includes a frame 10 on which a horizontal main conveyor 12 is mounted. A guide 13 (Fig. 3) is mounted above the conveyor 12, and, as shown in Fig. 6, is adapted to guide the elongated strip of fat pork meat 14 supported on the conveyor 12. The machine will be described with reference to the feeding of fat pork meat, but the machine can be used to feed bacon or other fatty materials or the like. The guide 13 extends along the conveyor as shown in Figs. 1 and 3. The strip of meat is fed in at the right hand end of the guide 13, as shown in Fig. 3, and is advanced by the conveyor 13 towards a can conveyor 15.

As shown in Fig. 1, the can conveyor 15 guides a plurality of open-topped cans 16 to pass below a head 17 to a can-filling machine 18 in which the cans are filled with beans in the usual manner.

From the guide 13, the strip of fat meat is advanced by a chain 19 (Figs. 1 and 3) which carries spikes 20 as shown in Fig. 8. The spikes 20 engage the strip of fat meat and move it toward the head 17. The chain 19 extends around a sprocket 21 spaced from the head 17. From the sprocket 21 to the head 17, the strip of meat is advanced by a star wheel 22 which has a plurality of points 22a which engage the strip and advance the strip across a dead plate 23 and through an opening 24 in the side of head 17 into the hollow interior of the head. The star wheel 22 is driven by a chain 26 which meshes with a sprocket 27 mounted on a shaft 28, which carries the star wheel.

When the end of the strip of fat meat has entered the head 17, it is cut off in the form of a short length or piece of fat meat 29 which falls into one of the cans 16, as shown in Fig. 8. This piece is cut off by a circular knife 31. As shown in Fig. 8, the knife 31 passes between the star wheel 22 and the head 17 to sever the piece 29 from the elongated strip 14.

As shown in Figs. 8, 9, and 10, the head 17 includes an inner chamber 32 and a steam jacket 33 surrounding the bottom, top, and one side thereof. Steam is led into the steam jacket 33 through an inlet fitting 34. A drain 36 is provided for removing condensate. The steam heats the walls of the head so that fatty material does not tend to stick or adhere to the interior thereof.

When a piece of pork fat meat 29 (Fig. 10) has been cut from the elongated strip 14, it is ejected by compressed air. The air is projected horizontally into the hollow interior of the head through an air inlet fitting 37 (Figs. 9 and 10). A puff of air under pressure is injected through the air inlet fitting 37 when the piece of meat is cut from the fat strip and the piece of fat meat travels substantially a quarter-circular path inside the head 17 (see Fig. 9) and is ejected downwardly through an opening 40 at the bottom of the head 17 into a can 16. Air under pressure is supplied to the air inlet fitting 37 through an air line 41 and a valve 42 (see Fig. 2). The air valve 42 has a valve stem 43 which extends upwardly therefrom and is engaged by a reciprocating valve actuating plunger 44. The valve actuating plunger 44 is driven by a connecting rod 46. Each time that a wheel 47 makes one turn, the valve stem 43 is engaged by the valve actuating plunger 44 and the valve stem 43 is depressed to send a puff of air into the head 17.

The wheel 47 is mounted on a shaft 48. As shown in Fig. 1, the shaft 48 is driven through a clutch 49 by a sprocket 51. The sprocket 51 is driven by a chain 52. The chain 52, in turn, is driven by a sprocket which is mounted on a shaft 53 which is driven by the can-filling device 18. The drive to the shaft 48 is so timed that the shaft 48 makes one turn for each can which is filled by the filling machine.

The shaft 48 carries a sprocket 57 which drives a chain 58 (Fig. 1). The chain 58 in turn drives a sprocket 59 (Fig. 3) mounted on a shaft 61. The shaft 61 carries a gear 62 which meshes with a gear 63. The gear 63, in turn, is mounted on a shaft 64 which extends into a gear box 66. Gearing (not shown) inside the gear box 66 drives a transverse shaft 67 when the shaft 64 is turned. The shaft 67 carries a gear 68 and a sprocket 69. The sprocket 69 drives a chain 71 which drives a sprocket 72. The sprocket 72 is mounted on shaft 73 which drives the main conveyor 12.

The gear 68 drives a gear 74 mounted on a shaft 76. The shaft 76 carries a sprocket 77 which drives a chain 78. The chain 78 in turn drives a sprocket 79 mounted on a shaft 81. The shaft 81 carries sprocket wheels which drive the chains 19 and 26 (see Fig. 1) to advance the strip of meat 14 (see Fig. 8) to the head 17 as explained hereinabove. As shown in Fig. 3, the spiked chain 19 has a section 82 which slopes downwardly and toward the head and a section 83 which travels parallel to the line of movement of the strip of meat. Guides 84 and 85 mounted on a frame 85a guide the sections of the chain 19.

The knife 31 rotates on its axis and swings in an orbital manner about the axis of a sleeve 86 (see Fig. 4). The sleeve 86 is rotatably mounted in bearings 87 and 88 (Fig. 3). A sprocket wheel 89 (Fig. 4) mounted on the sleeve 86 is driven by a chain 91. The chain 91 extends around idle sprocket wheels 92 and 93 and around a sprocket wheel 94 mounted on the swings therewith. A 96 is mounted on the sleeve 86 and swings therewith. A bearing 97 is mounted on the cross arm 96 and rotatably supports a shaft 98 on which the knife 31 is mounted. As the shaft 48 turns, the sleeve 86 is turned to swing the knife blade in an orbital manner.

The knife is rotated on its axis by a motor 99. As shown in Fig. 3, the motor 99 drives a belt 100 which drives a pulley 101. The pulley 101 is coaxial with the sleeve 86. The pulley 101 is mounted on a shaft 102 which extends through the sleeve as shown in Fig. 4. The shaft 102 carries a sprocket wheel 103 (Fig. 3) on which a chain 104 runs. The chain 104, in turn drives a sprocket wheel 106 mounted on the knife shaft 98.

When the machine is in use, cans 16 (Fig. 1) on the conveyor 15 pass below the head 17 on the way to the filling machine 18. As each can passes the head 17, the knife 31 swings in one orbit past the head severing one piece of the pork fat meat from the elongated strip 14 (see Fig. 8). As the knife orbits, it is rotated on its axis by the motor 99. As each piece of the strip is cut therefrom, the strip is fed further into the head 17 by the action of the main conveyor 12, the spiked chain conveyor 19 and the star wheel 22 acting in unison. When a piece 29 is cut from the elongated strip, a puff of air from the air inlet fitting 37 blows the piece 29 into one of the cans 16. The walls of the head member are heated by the steam jacket 33 so that the piece of fat meat 49 does not adhere to the walls of the head member.

The machine illustrated in the drawings and described above is subject to structural modification without departing from the spirit and scope of the appended claims.

Having described my invention, what I claim as new, and desire to secure by Letters Patent is:

1. In a machine for loading pieces of fat meat into containers, the combination of a head member which comprises a hollow body, a steam jacket embracing said body for heating the walls of the body, there being an opening in a side wall of the body for receiving a horizontally extending end portion of an elongated strip of fat meat with the end portion extending into the head member and free of support therein, means for injecting a puff of air under pressure horizontally against the end portion of the strip transversely of the direction of advance of the strip, and a knife assembly, said knife assembly comprising a circular knife, means for mounting said knife for rotation and for orbital movement, means for rotating said knife, and means for causing the knife to orbit in timed relation with the air injection means for severing the end portion of the strip from the remainder of the strip, there being a quarter-circular path inside the head member, the head member having a downwardly facing opening spaced from the side wall opening, the puff of air propelling the severed end portion along said path to be ejected downwardly from the head member.

2. In a machine for loading pieces of fat meat into containers, the combination of a head member which comprises a hollow body, there being an opening in a side wall of the body for receiving an end portion of an elongated strip of fat meat with the end portion extending into the head member and free of support therein, means for injecting a puff of air under pressure against the end portion of the strip transversely of the direction of advance of the strip, and a knife assembly, said knife assembly comprising a circular knife, means for mounting said knife for rotation and for orbital movement, means for rotating said knife, and means for causing the knife to orbit in timed relationship with the air injecting means for severing the end portion of the strip from the remainder of the strip, the head member having a downwardly facing opening, the puff of air propelling the severed end portion through the head member to be ejected downwardly from the head member through the last mentioned opening.

3. In a machine for loading pieces of fat meat into containers, the combination of a head member which comprises a hollow body, there being an opening in a side wall of the body for receiving an end portion of an elongated strip of fat meat with the end portion extending into the head member and free of support therein, means for injecting a puff of air under pressure against the end portion of the strip transversely of the direction of advance of the strip, and a knife assembly, said knife assembly comprising a circular knife, means for mounting said knife for rotation and for orbital movement, means for rotating said knife, and means for causing the knife to orbit in timed relationship with the air injecting means for severing the end portion of the strip from the remainder of the strip, the head member having a downwardly facing opening, the puff of air propelling the severed end portion through the head member to be ejected downwardly from the head member through the last mentioned opening.

4. In a machine for loading pieces of fat meat into containers, the combination of a head member which comprises a hollow body, there being an opening in a side wall of the body for receiving an end portion of an elongated strip of fat meat with the end portion extending into the head member and free of support therein, means for injecting fluid under pressure against the end portion of the strip transversely of the direction of advance of the strip, and a knife assembly, said knife assembly comprising a circular knife, means for mounting said knife for rotation and for orbital movement, means for rotating said knife, and means for causing the knife to orbit in timed relationship with the fluid injecting means for severing the end portion of the strip from the remainder of the strip, the head portion having a downwardly facing opening, the fluid propelling the severed end portion through the head member to be ejected downwardly from the head member through the last mentioned opening.

References Cited in the file of this patent

UNITED STATES PATENTS

| Number | Name | Date |
| --- | --- | --- |
| 1,976,866 | Van Berkel | Oct. 16, 1934 |
| 2,001,512 | Walter | May 14, 1935 |
| 2,041,060 | Gardner | May 19, 1936 |
| 2,386,775 | Balzarini | Oct. 16, 1945 |
| 2,541,907 | Appling | Feb. 13, 1951 |
| 2,547,207 | Harworth et al. | Apr. 3, 1951 |
| 2,718,993 | McKinnon | Sept. 27, 1955 |
| 2,765,829 | DeBack et al. | Oct. 9, 1956 |